(12) United States Patent
Alexander, Jr.

(10) Patent No.: US 7,718,026 B2
(45) Date of Patent: May 18, 2010

(54) RETRACTABLE CLIP PRESS

(75) Inventor: Charles W. Alexander, Jr., Falmouth, MA (US)

(73) Assignee: Pak Secure System LLC, Houston, TX (US)

( * ) Notice: Subject to any disclaimer, the term of this patent is extended or adjusted under 35 U.S.C. 154(b) by 412 days.

(21) Appl. No.: 11/948,225

(22) Filed: Nov. 30, 2007

(65) Prior Publication Data

US 2009/0139186 A1  Jun. 4, 2009

(51) Int. Cl.
*B32B 37/00* (2006.01)
(52) U.S. Cl. .................... 156/228; 156/581; 156/583.1; 53/173; 53/559
(58) Field of Classification Search ............... 156/228, 156/580, 581, 583.1; 53/173, 290, 300, 367, 53/373.7, 374.8, 375.6, 375.9, 559; 493/52, 493/113
See application file for complete search history.

(56) References Cited

U.S. PATENT DOCUMENTS

| | | | |
|---|---|---|---|
| 3,254,471 A | 6/1966 | Morham | |
| 3,657,055 A | 4/1972 | Nichols | |
| 3,693,318 A | 9/1972 | Blazer | |
| 4,246,223 A | 1/1981 | Patterson | |
| 4,263,767 A | 4/1981 | Kyle | |
| 4,653,642 A | 3/1987 | Hakun | |
| 4,840,275 A | 6/1989 | Faiola | |
| 4,981,213 A | 1/1991 | Dillon | |
| 5,522,505 A | 6/1996 | Giovannone | |
| 5,593,532 A * | 1/1997 | Falk et al. | ............... 156/285 |
| 5,607,101 A | 3/1997 | Saito | |
| 5,704,481 A | 1/1998 | Lutz | |
| 6,016,913 A | 1/2000 | Tilton | |
| 6,050,415 A | 4/2000 | Lind | |
| 6,308,832 B1 | 10/2001 | Pirro | |
| 6,367,530 B1 * | 4/2002 | Shimotomai | ............... 156/382 |
| 6,499,271 B1 | 12/2002 | Lastovich | |
| 6,615,986 B2 | 9/2003 | Pirro | |
| 6,676,584 B2 | 1/2004 | Tachikawa | |
| 6,691,870 B1 | 2/2004 | Palm | |
| 6,708,820 B2 | 3/2004 | Hansen | |
| 6,736,267 B2 | 5/2004 | Schamante | |
| 6,793,077 B1 | 9/2004 | Kancsar | |
| 6,843,370 B2 | 1/2005 | Tuneberg | |
| 6,845,585 B2 | 1/2005 | Callander | |

(Continued)

OTHER PUBLICATIONS

Notification Of Trasmittal Of The International Search Report And The Written Opinion Of The International Searching Authority, Or The Declaration. PCT/US07/24862.

*Primary Examiner*—James Sells
(74) *Attorney, Agent, or Firm*—David McEwing (57) ABSTRACT

The specification discloses a cardboard and blister pack packaging and sealing machine that includes an upper and lower heater and die combination that can be compressed together over a package for sealing using heat activated adhesives. The machine may use at least one piston and rod device or pump to provide the necessary energy or pressure. The machine may include a moveable tray containing at least one aperture to hold an unsealed package wherein the unsealed package can be moved proximate to the upper and lower heaters and dies and the upper and lower heaters and dies can press together. In this way, both the top and bottom dies may be heated and the operator is not required to remove the sealed packaging from the hot die.

10 Claims, 8 Drawing Sheets

U.S. PATENT DOCUMENTS

| | | |
|---|---|---|
| 6,889,840 B2 | 5/2005 | Schein |
| 6,896,139 B2 | 5/2005 | Kancsar |
| 6,964,338 B2 | 11/2005 | Kancsar |
| 7,051,876 B2 | 5/2006 | Grosskopf |
| 7,207,441 B2 | 4/2007 | Ritter |
| 2003/0018586 A1 | 1/2003 | Krahn |
| 2004/0251159 A1 | 12/2004 | Tingey |
| 2006/0151350 A1 | 7/2006 | Tilton |
| 2007/0029223 A1 | 2/2007 | Mazurek |
| 2007/0051652 A1 | 3/2007 | Tilton |
| 2007/0062836 A1 | 3/2007 | Nazar |
| 2007/0114153 A1 | 5/2007 | Ritter |
| 2007/0114154 A1 | 5/2007 | Ritter |
| 2007/0125678 A1 | 6/2007 | Green |
| 2007/0187273 A1 | 8/2007 | Grosskopf |

\* cited by examiner

RETRACTABLE CLIP PRESS

BACKGROUND

1. Field of Use

The machine and associated tooling disclosed in this specification may be used for sealing cardboard, corrugated board or paper packaging utilizing adhesives or similar materials. The packaging may contain plastic containers for merchandise, hereinafter "blister packs" that may protrude from one or both sides of the packaging.

2. Related Technology

There are a number of package designs to deter theft, communicate information, protect package contents, etc., including the sealing of packaging, including packaging containing blister packs.

SUMMARY OF DISCLOSURE

A cardboard and blister pack packaging and sealing machine with associated tooling is disclosed. The tooling, that may be interchangeable, includes an upper and lower heater and die combination that can be compressed together over a package for sealing using heat activated adhesives. The machine may use at least one piston and rod device or pump to provide the necessary energy or pressure. Other mechanical devices may be used.

The tooling may include a moveable tray containing at least one aperture to hold an unsealed package wherein the unsealed package can be moved proximate to the upper and lower heaters and dies and the upper and lower heaters and dies can press the unsealed package together.

SUMMARY OF DRAWINGS

The accompanying drawings, which are incorporated in and constitute a part of the specification, illustrate embodiments of the invention. These drawings, together with the general description of the invention given above and the detailed description of the embodiments, i.e., examples given below, serve to explain the principles of the invention.

DETAILED DESCRIPTION OF SPECIFICATION

While the machine and tooling disclosed herein is susceptible of embodiments in many different forms, there is shown in the drawings and will herein be described in detail embodiments with the understanding that the present disclosure is to be considered as an exemplification of the principles of the disclosure and these examples are not intended to limit its broad aspect. The above general description and the following detailed description are merely illustrative and additional modes, advantages and particulars will be readily suggested to those skilled in the art without departing from the spirit and scope of the invention.

The sealing machine is used in conjunction with tooling to seal packaging. The tooling may be interchangeable, i.e., differing tooling can be installed on the machine for the sealing of different size or shaped packages.

The packaging can consist of, for example, two sheets of corrugated board, a single sheet of corrugated board and an SBS paper sheet, or two sheets of SBS paper. The packaging may also comprise additional sheets of corrugated board or SBS paper. There may be printing on one or both sides of the corrugated board or paper.

The packaging may also comprise one or more blister pack container. The blister pack will contain a product such as a consumer product for purchase. The blister pack is often a clear plastic shell that fits through an aperture of one of the two sheet of packaging. The blister pack also has extending flat peripheral sections that are sandwiched between the two sheets. For example, the blister pack is held in place by the extensions sandwiched between the corrugated cardboard. The extensions are larger than the aperture of the card.

Further the packaging card can comprise a single card that is folded over onto itself with the blister shell sandwich between the two halves of the card or two cards. One of the card halves will have an aperture for the blister pack.

The unsealed cards may be held in trays. The cards lay in a flat position held by a plurality of spring activated hinged clips. The unsealed cards rest on a flat surface of the clips. The clips are hinged to the tray. A component of the clips is an elongated piece containing a beveled edge. The tray contains at least one aperture dimensioned to contain a card or multiple apertures for the packaging of multiple cards.

The interior portion or interfacing portion of the cards may be coated with a heat activated adhesive.

In one embodiment, a piston device may be engaged to laterally move a lower plate holding the lower die and heater. The movement of the piston device locks multiple upper anvil components (attached to the bottom surface of the lower plate) in a position over lower anvils. The lower anvils are mounted to the main structure plate of the machine. There is an approximate ¼ inch gap maintained between the lower and upper anvil. In one embodiment, the surfaces of each anvil are rubber coated or coated with a similar cushioning material. Similarly the top of the upper anvil attached to the lower plate may be similarly coated with a cushioning material.

The tray holding the cards to be sealed is horizontally mounted. In one embodiment, it slides horizontally into the machine to the sealing position. In this position, the cards are located below the tooling of the top die and heater. The cards are also above the tooling of the lower die and heater mounted on a lower plate.

In one embodiment, the lower plate containing the heater and the lower die is elevated. In one embodiment, this is performed by activation of a 1,200 psi pneumatic cylinder. A hydraulic cylinder or other motorized device may be used.

The elevation of the lower die pushes against the lower beveled portion of the spring activated hinged clips extending below the tray. These clips constitute part of the tooling of the tray. The lower portion of the clips include a bevel that pushes and horizontally rotates the clip on the hinge. The hinge spring is compressed and the clip moves into a recess in the tray. In another embodiment, the spring activated hinged clips may be cylindrical or conical. They will have a flat, horizontal surface capable of holding the card.

After the clips are pushed and rotated by elevation of the lower die, the card is no longer resting on the clip but rather resting directly on the lower die or upon the springs that are affixed to the die. The lower springs may optionally contain horizontally oriented stabilizer plates to facilitate holding the card.

It will be appreciated that the tooling die surface matches the final configuration of the package intended to be sealed. For example, each die surface (upper and lower) will contain pultrusions where the corrugated cards are to be pressed together. These can include pultrusions around the blister pack. These can be pultrusions running continuously and without interruption around the periphery of package. It will be appreciated that moving the spring activated hinged clips into the recesses of the tray facilitate a continuous seal around the periphery of the package.

In one embodiment, the tooling dies have an anodized coating or fiberglass cloth to prevent adhesion of the outside cards to the dies.

In an embodiment of the machine operation, after the lower plate is elevated, the upper die and heater is activated and lowered. In one embodiment, the upper die and heater is activated by extension of a 32,000 psi hydraulic cylinder. The cylinder, which may be mounted below the main structure plate, pushes down and pulls a plurality of auxiliary rods vertically oriented from the bottom of the machine to the top. The pulling of the auxiliary rods causes the upper heater and die to move down and press against the lower die. Since in the embodiment described, the 32,000 psi hydraulic cylinder overcomes the resistance of the 1,200 psi pneumatic cylinder. This results in the top and bottom dies moving downward to engage the top and bottom anvils. The spacing between each top and bottom anvil permits adjustment for thickness irregularities in the packages being sealed.

After the completion of the heating and pressing cycle, the top die and heater return to their elevated position at the top of the machine. Similarly, the lower die and heater return to their original position. The withdrawal of the lower die from the tray results in redeployment of the spring activated clips. The clips pivot on the spring hinges and move back under the now sealed packaging.

The temperature of the heaters may be between approximately 150° F. and 650° F. The dwell time for a sealing cycle may be between 1.5 seconds and 6.5 seconds. The pressure may be between 16000 psi and 32000 psi for a 24 inch by 24 inch die.

In one embodiment, both the upper and lower die holders can be configured to hold variable sized or patterned dies. This allows the machine to be used to seal differing packages.

The tray can be pulled out horizontally from between the top and lower die (and heaters) and the sealed packaging removed. The tray can be reloaded with unsealed packaging. It will be appreciated that the machine permits the operators to safely remove the sealed packages without touching the hot dies. Yet during the compression step, only the dies are in contact with the package.

The tooling can be configured to hold two trays. One tray can be loaded or unloaded while the other tray is positioned between the upper and lower dies and the packages being sealed.

In another embodiment, the machine may be equipped with four or six trays mounted on a turntable format.

In yet another embodiment, the tooling may be configured to operate as a conveyor transporting unsealed packages through the machine. There can be multiple trays loaded with unsealed packaging. Each tray can be processed through the machine tooling, e.g., heaters and dies, in a conveyor fashion. The sealed packages exit the machine and the trays can be unloaded and unsealed packages loaded.

Figure 1:
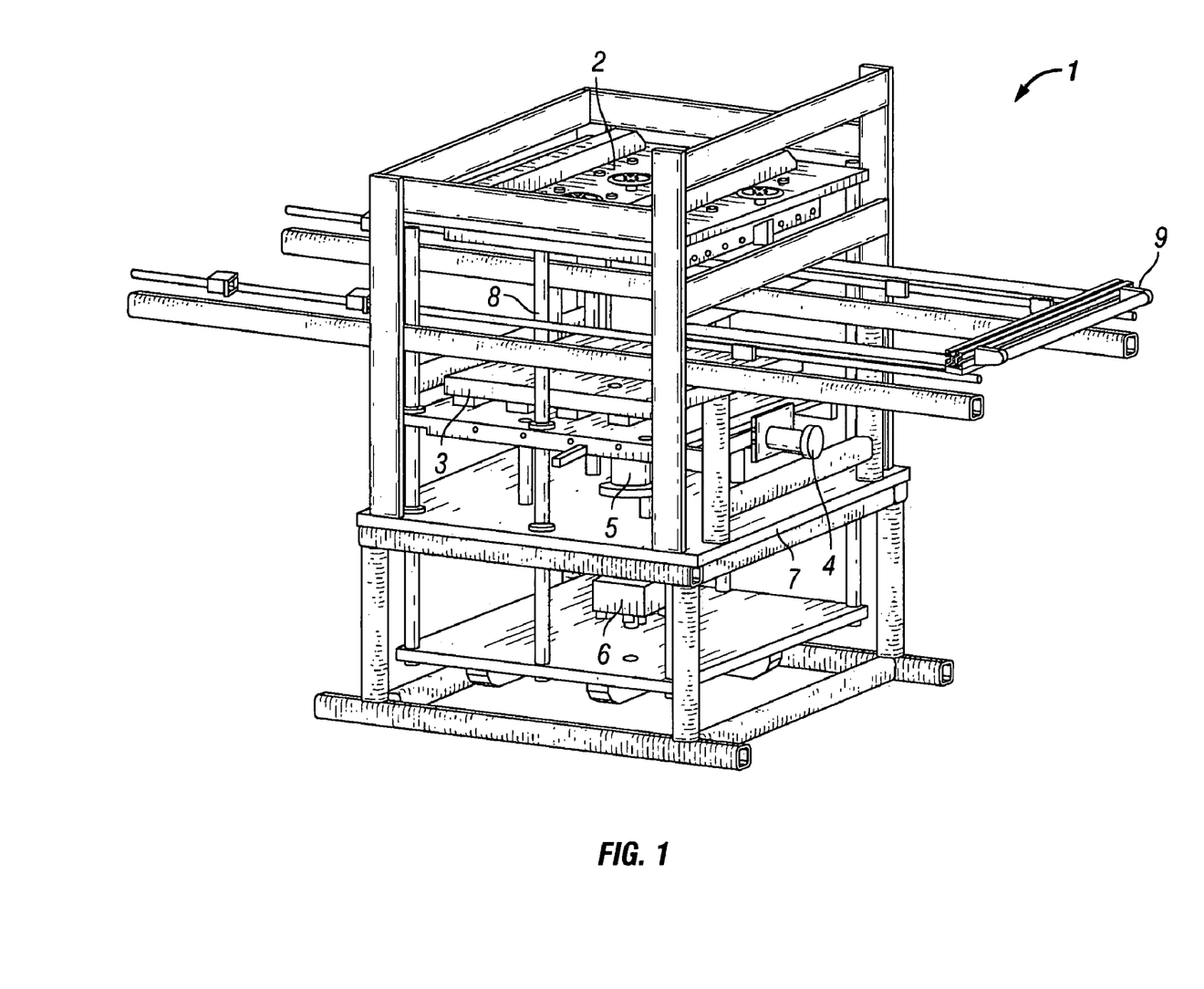
FIG. 1 illustrates a perspective view of the machine subject of the disclosure.

FIG. 1 is an isometric view of one embodiment of the machine 1 subject of this disclosure. There is a top heater 2 with a die attached underneath. There is also a bottom heater 3. The attached bottom die is not shown. The bottom heater and die are elevated by action of a pneumatic cylinder 5. The top heater and die are pulled down by a hydraulic cylinder 6. The hydraulic cylinder pulls the auxiliary rods 8 which are in turn connected to the top heater and die. In the embodiment illustrated, the mechanisms of the machine utilize the structural integrity of the main support plate 7. Also illustrated is the pneumatic cylinder 4 controlling the lockable anvils (not shown). Also illustrated in the handle 9 for controlling the position of the tray holding the packaging.

Figure 2:
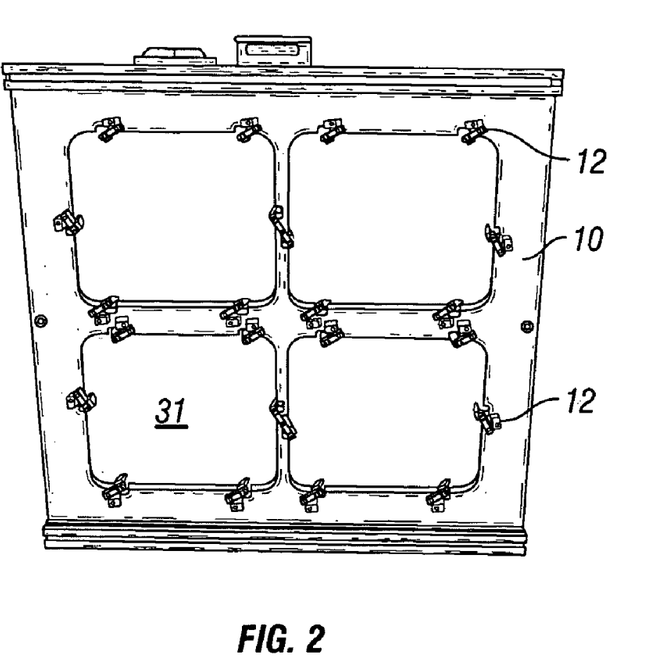
FIG. 2 illustrates a top view of a tooling tray used to hold the packaging. Included are the retracting spring action hinged clips used to hold the packaging during a segment of the package sealing cycle.
Figure 3:
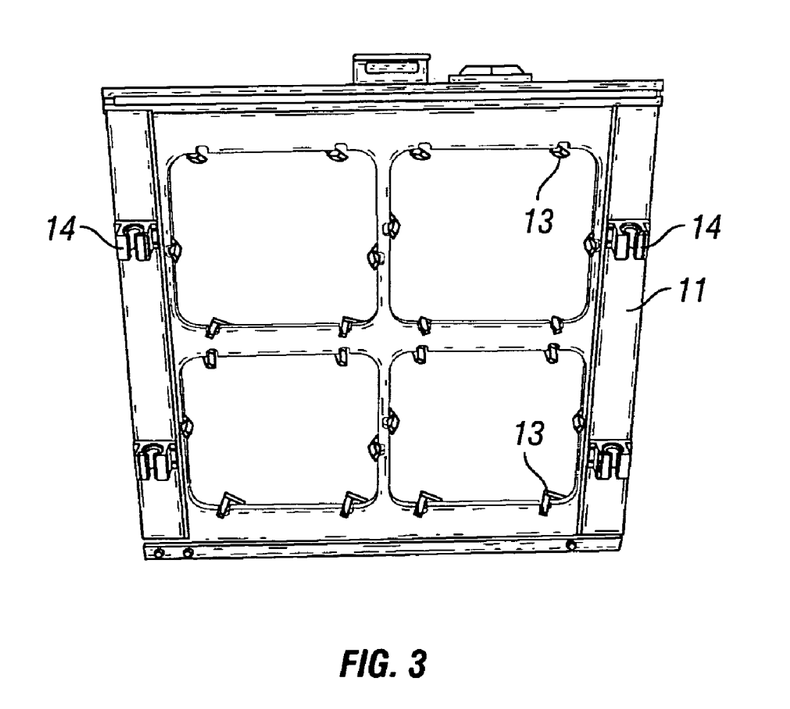
FIG. 3 illustrates a bottom view of the tray with the extended portion of the hinged clips.

FIGS. 2 and 3 illustrate the top 10 and bottom 11 views respectively of the tray. An aperture 31 matching the packaging is illustrated. Also illustrated is the top view of the clips 12. The extended bottom component 13 of the clips is illustrated in FIG. 3. Also illustrated are the attachments 14 used to slide the tray.

Figure 4:
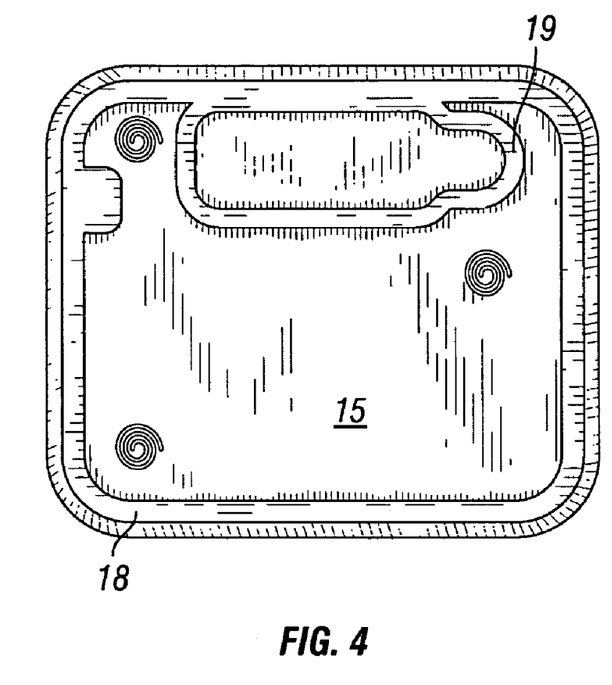
FIG. 4 illustrates the heatable top die used to press the packaging down to the bottom die for sealing. The top die extends downward and compresses against the lower die.

FIG. 4 illustrates the top die 15 including the extendible springs 17. The extendible springs (top and bottom) may have horizontally oriented stabilizer plates (not shown). The protrusions of the die (which press down upon the packaging during compression) are shown 18, 19. Note that one protrusion (or ridge) extends along the periphery of the packaging. The other protrusion encircles the blister pack. The die matches the dimensions of the packaging. The extendible spring are intended to contact the packaging, now unsupported by the retracted clips.

Figure 5:
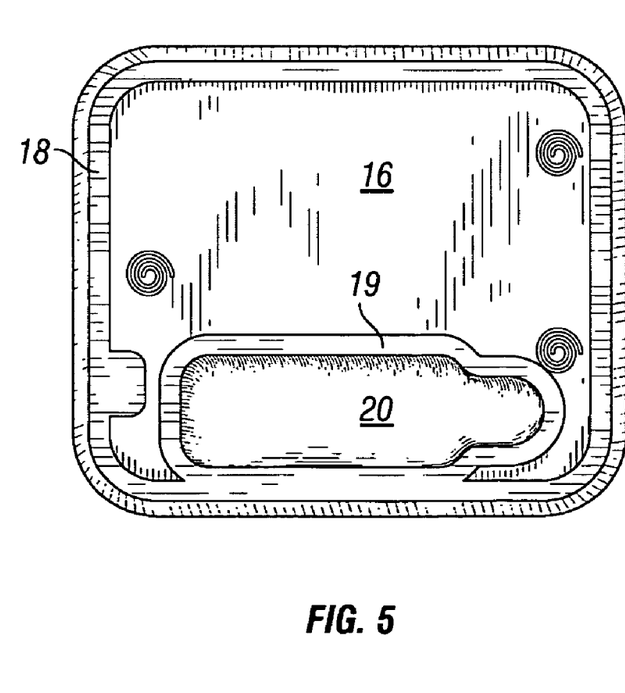
FIG. 5 illustrates the heatable bottom die, including the cavity for the blister pack forming part of the package for sealing. Also illustrated are the extended springs used to hold the packaging in place prior to the compression of the lower and upper die.

FIG. 5 illustrates the bottom die 16. It includes extendible springs 17 intended to support the packaging as the clips retract with the elevation of the bottom die. Also included is the protrusion 18 extending around the periphery of the packaging and the protrusion extending around the blister pack. The bottom die also includes an indentation 20 matching the size of the blister pack protruding from the packaging.

Figure 6:
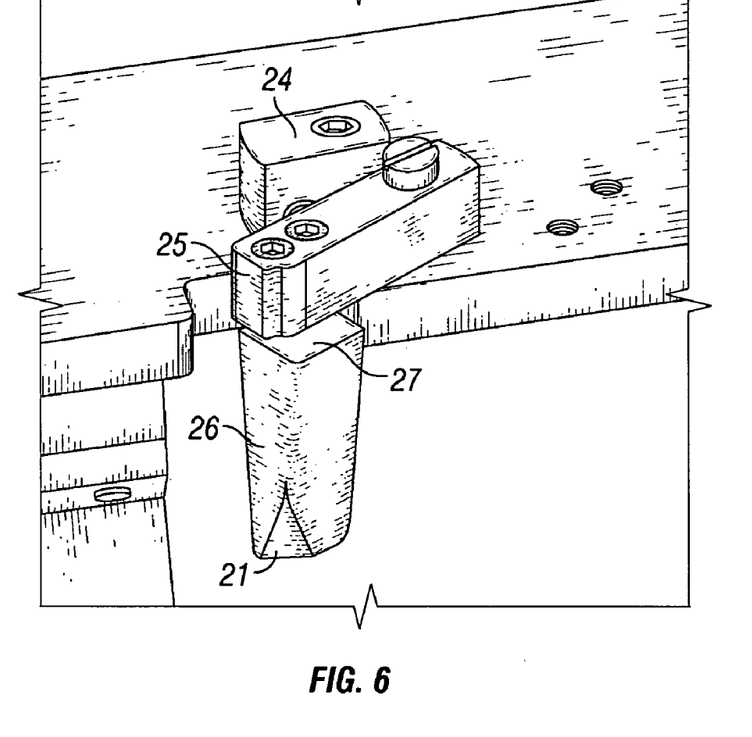
FIGS. 6 and 7 illustrate the retractable clips mounted to the top of the tray. The beveled lower portion is shown extending below the tray where it can engage with the elevating lower die. Also shown is the spring powered hinge.
Figure 7:
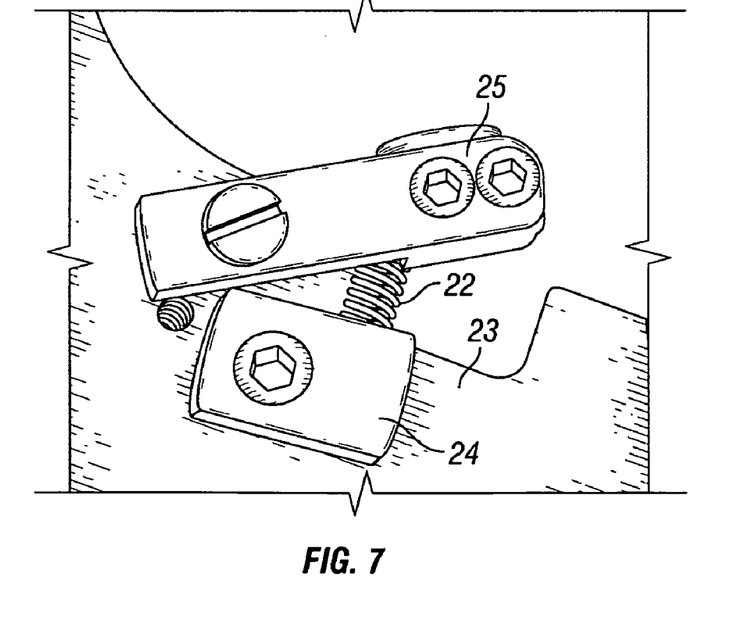
Figure 8:
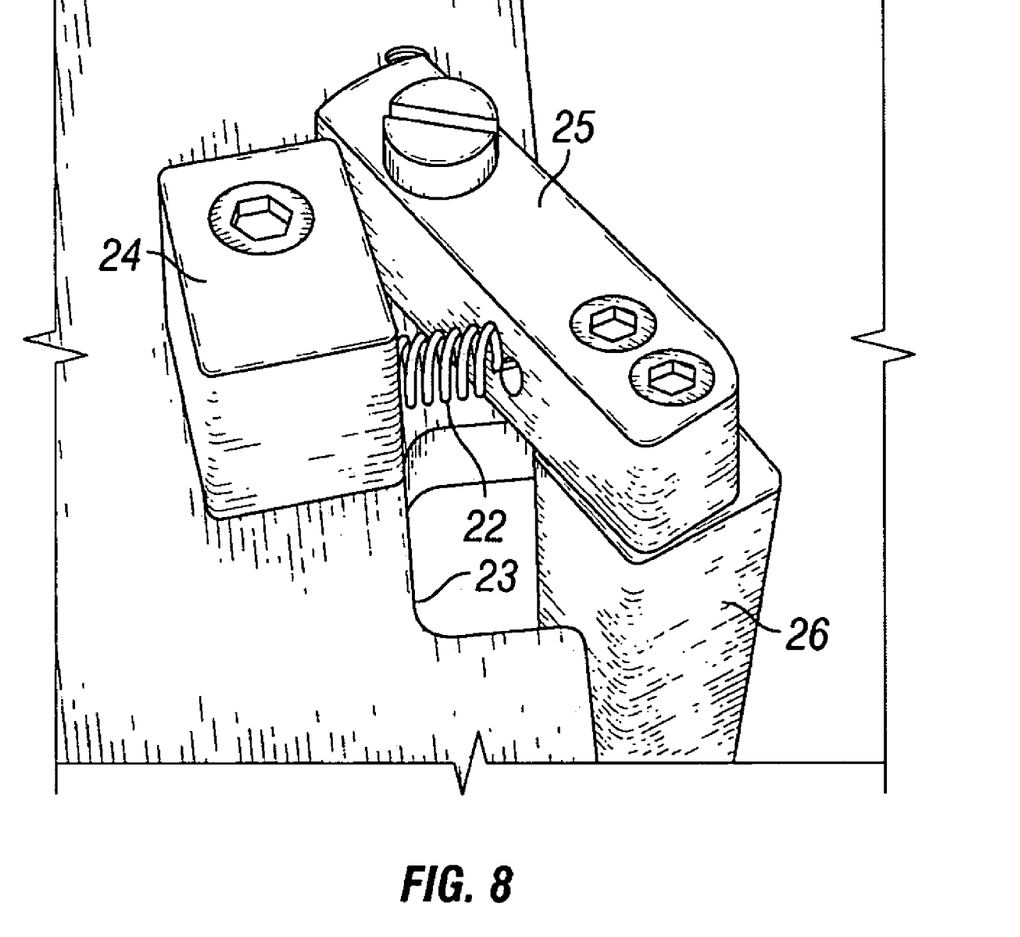
FIG. 8 illustrates another view of the spring activated hinge of the retractable clip and the cut out of the template that can hold the retracted clip.

FIGS. 6, 7 and 8 illustrate details of the retractable clips. These clips hold the packaging at the beginning of the sealing process and then again at the end. The clips comprise a post 24 screwed into the tray, a pivoting arm 25, and extended lower component 26, and a bevel edge 21 designed to contact with the elevating bottom die. Also shown is the horizontal surface 27 upon which the unsealed package is carried. This surface can be the top of the elongated component 26 but other configurations are possible.

FIG. 7 illustrates the post 24, in conjunction with the spring 22 and the pivot arm 25. Also shown is the recess 23 within the tray that is dimensioned to hold the retracted clip. FIG. 8 illustrates the same components with the addition of the elongated bottom component 26.

Figure 9:
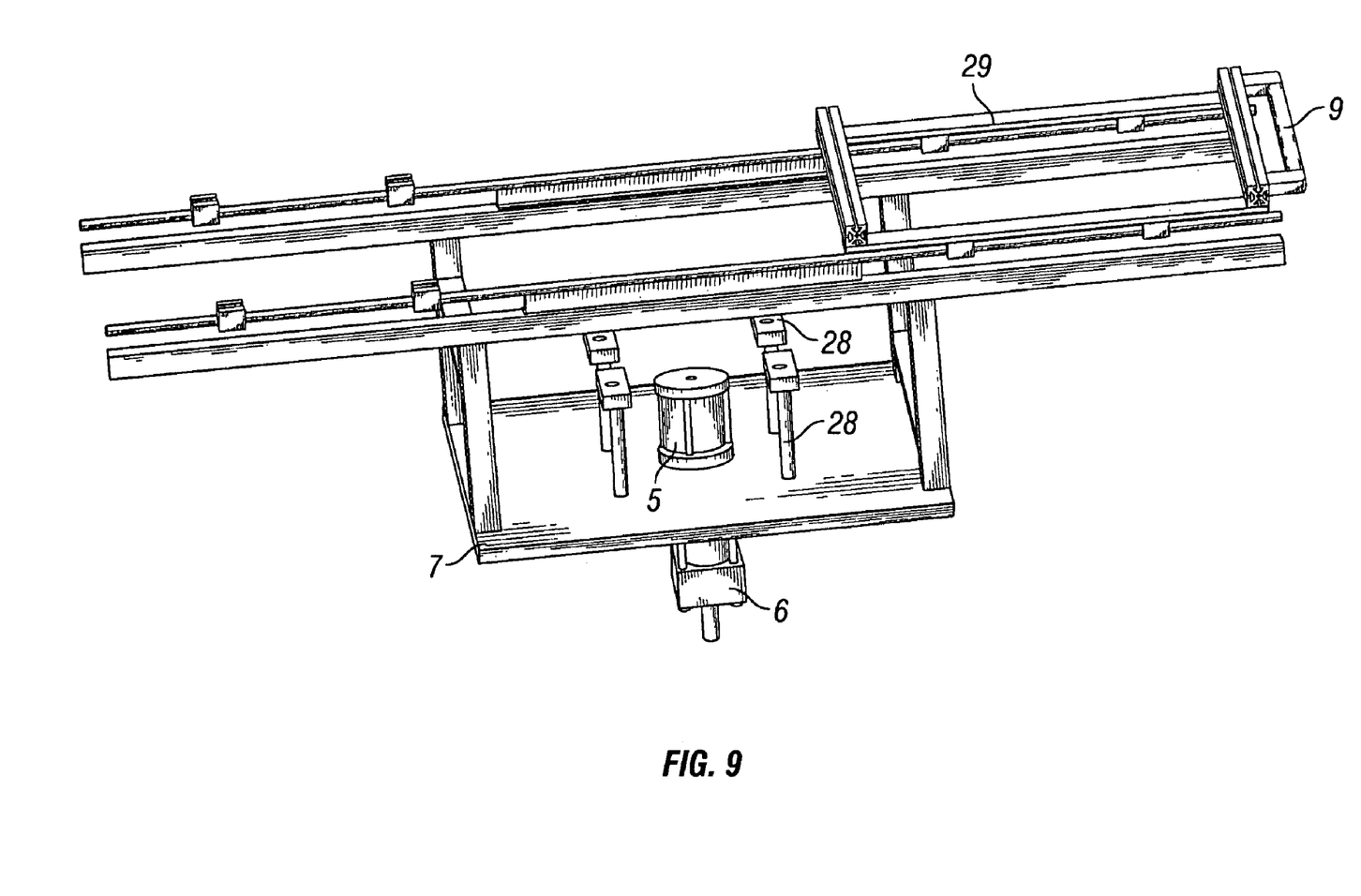
FIG. 9 illustrates a portion of the machine, particularly the lower anvils mounted on the machine structure plate.

FIG. 9 illustrates components of the machine illustrated in FIG. 1. The pneumatic cylinder 5 is illustrated. The cylinder moves the lower heater and die up and down. Also shown is the hydraulic pump 6 that controls the upper heater and die plate. Also shown is the main structure plate 7 that anchors the components of the machine. Also illustrated are the lower anvils 28 mounted on the structure plate. Also illustrated is the tray handle 9 and the sliding tray holder 29.

Figure 10:
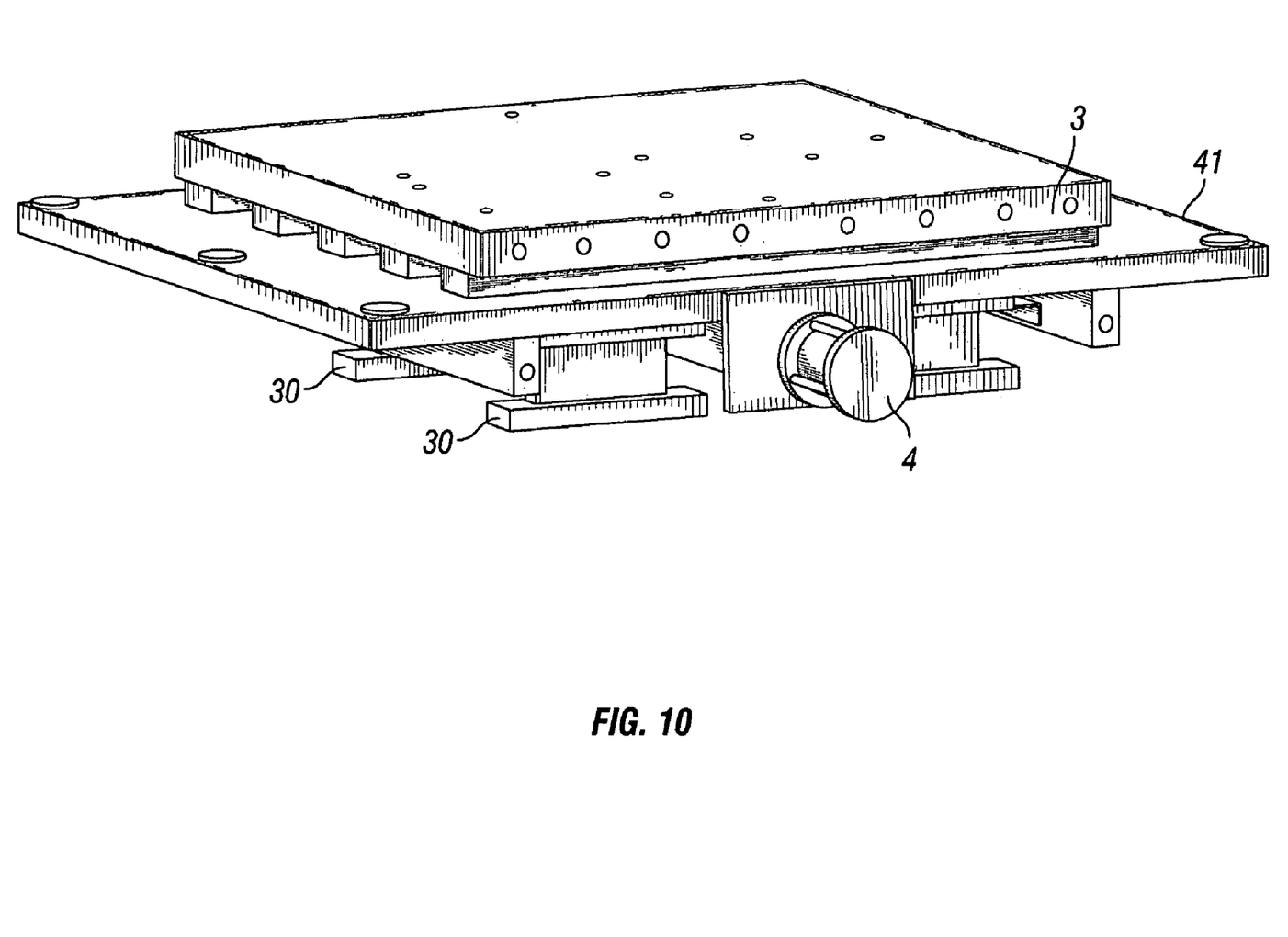
FIG. 10 illustrates another portion of the machine, particularly the upper anvil components that can be aligned over the lower anvil components.

FIG. 10 illustrates the upper anvil components 30. The anvils are attached to a plate 41 that can move laterally as controlled by the pneumatic cylinder 4. Also illustrated is the bottom heater 3. This movement allows the lower and upper anvil components to become aligned and supply support with the upper and lower heaters and die plates are pressed together. It will be appreciated that in the embodiment described, the force of compression will be downward. The load can be transferred to the structural plate. In another example, the compressive force may be upward against the upper die and heater.

Figure 11:
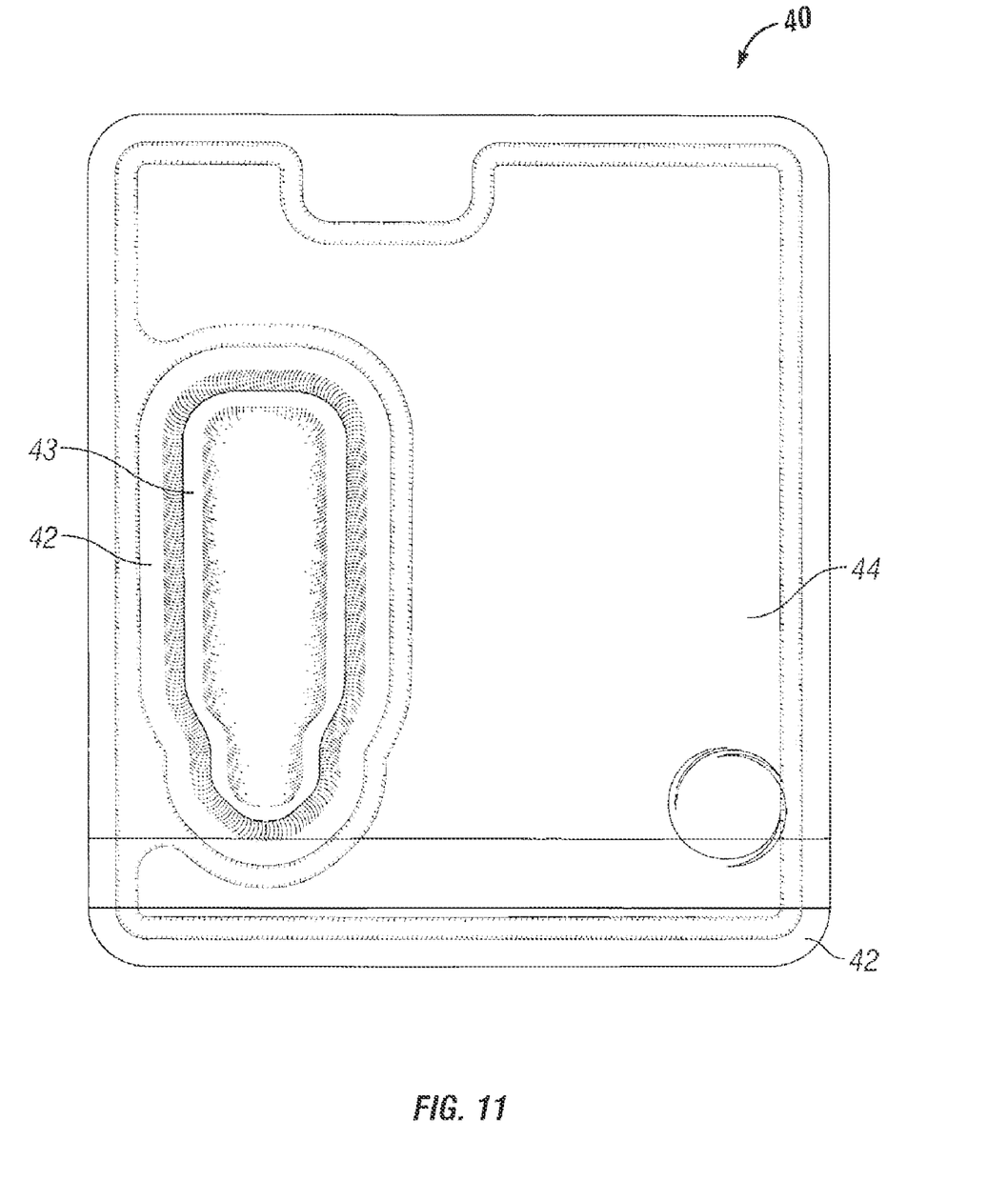
FIG. 11 is an illustration of an example of a package sealed by the machine.

FIG. 11 illustrates an example of a package 40 that may be sealed by the machine. The package contains a blister pack 43 which may be made of clear plastic such as polystyrene. The packaging comprises two sheets of cardboard. The top sheet has an aperture matching the protruding surface of the blister pack. An area 42, which may be comprised of two cardboard sheets around the blister pack, is compressed. The back sheet and the front sheet are pressed and sealed together. Included in the compressed area may be the lateral flanges that comprise part of the blister pack held behind the cardboard.

In the example shown, the outer edge 43 of the package may be compressed. The compression may also be within a variable distance of the edge. This can be a function of the tooling.

The package surface, as illustrated, may contain writing or graphics.

This specification is to be construed as illustrative only and is for the purpose of teaching those skilled in the art the manner of carrying out the invention. It is to be understood that the forms of the invention herein shown and described are to be taken as the presently preferred embodiments. As already stated, various changes may be made in the shape, size and arrangement of components or adjustments made in the steps of the method without departing from the scope of this invention. For example, equivalent elements may be substituted for those illustrated and described herein and certain features of the invention may be utilized independently of the use of other features, all as would be apparent to one skilled in the art after having the benefit of this description of the invention.

Further modifications and alternative embodiments of this invention will be apparent to those skilled in the art in view of this specification.

While specific embodiments have been illustrated and described, numerous modifications are possible without departing from the spirit of the invention, and the scope of protection is only limited by the scope of the accompanying claims.

What I claim is:

1. A cardboard and blister pack packaging and sealing machine comprising:
    a) an upper heater and controllably moveable downward by guide rods connected to a cylinder and piston combination;
    b) a lower heater and die controllably moveable upwards by a cylinder and piston combination;
    c) a moveable tray containing at least one aperture to contain an unsealed package wherein the unsealed package can be moved proximate to the upper and lower heaters and dies and the upper and lower heaters and dies can press together;
    d) a plurality of clips pivotably attached to the tray and moveable in response to movement of the lower die or heater and the clips may hold an unsealed package;
    e) each clip contains a beveled portion that causes the clip to pivot horizontally in response to contact with the upward movement of the lower die; and
    f) the moveable tray contains recesses for the pivoting clips.

2. The machine of claim 1 further comprising extending springs attached to the surface of at least one die to support the packaging before the top and bottom die press together.

3. The machine of claim 1 further comprising the upper heater and die controlled by a hydraulic cylinder.

4. The machine of claim 1 further comprising lower heater and die controlled by a pneumatic or hydraulic cylinder.

5. A continuous peripheral edge package sealing machine comprising:
    a) a heatable top die containing extendible springs for contacting the package and die surface protrusions for pressing the package;
    b) a heatable bottom die containing extendible springs for contacting the package and die surface protrusions for pressing the package;
    c) a tray with pivoting clips for temporary holding the packages before and after compression of the die;
    d) a power source for moving at least one of the die into contact with the other die;
    e) each clip contains a beveled portion that causes the clip to pivot horizontally in response to contact with upward movement of the lower die;
    f) the tray containing recesses for the pivoted clips; and
    g) movement of the clips from the top and bottom die compression location.

6. The machine of claim 5 further comprising the protrusions of the top die matching the protrusions of the bottom die.

7. The machine of claim 5 further comprising sealing the package adjacent to a blister pack.

8. The machine of claim 5 further comprising the tray being moveable.

9. The machine of claim 8 further comprising the tray being moveable in a horizontal direction.

10. A method for sealing a cardboard packaging comprising:
    a) positioning a moveable tray containing at least one aperture wherein and unsealed package can be positioned within the aperture and the package supported by pivoting clips and moved proximate to upper and lower heaters and dies;
    b) moving the upper heater and die downward wherein the movement is controlled by guide rods connected to a cylinder and piston combination;
    c) moving the lower heater and die upward by a cylinder and piston combination;
    d) pressing the upper and lower heaters and dies together with the unsealed package positioned between the upper and lower heaters and dies; and
    e) pivoting clips attached to the moveable tray in response to the upward moving lower heater and die contacting beveled portions of each clip causing the clips to pivot horizontally into recesses of the tray.

* * * * *